United States Patent Office 3,562,026
Patented Feb. 9, 1971

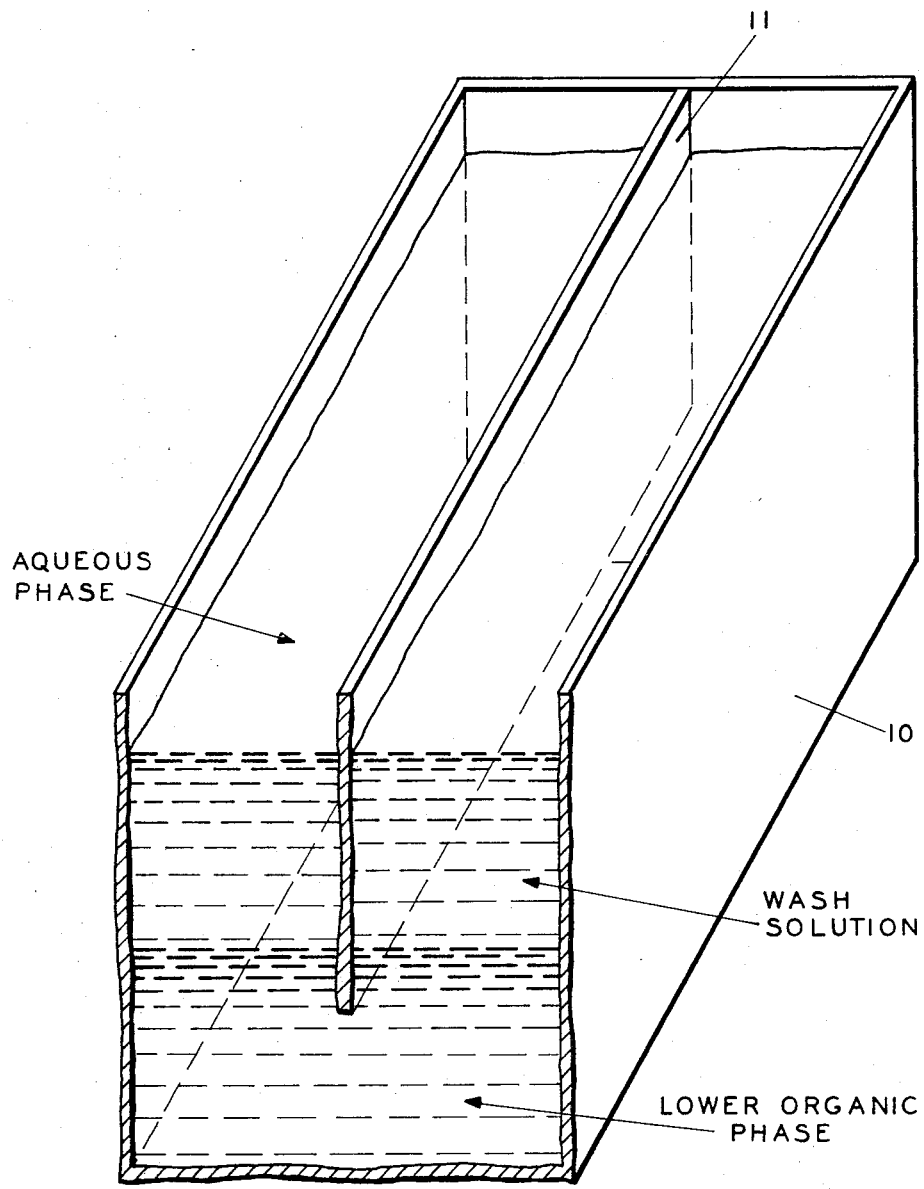

3,562,026
METHOD OF QUENCHING EMPLOYING WASH SOLUTION
Delbert J. Massey, Des Peres, Mo., assignor to Monsanto Company, St. Louis, Mo., a corporation of Delaware
Filed Oct. 24, 1967, Ser. No. 677,698
Int. Cl. C21d 1/62
U.S. Cl. 148—18                                    18 Claims

ABSTRACT OF THE DISCLOSURE

Quenching process providing an aqueous wash solution to reduce dragout losses of an organic quenchant heavier than water. The wash solution floats upon the surface of the organic quenchant but a partition allows part of the organic quenchant surface to remain exposed for quenching. If a water quench is desired to precede the organic quench, an aqueous phase is disposed above the organic phase adjacent the partition and thus isolated from the wash solution.

---

The present invention is applicable to quenching systems employed for the quenching of metal articles. More specifically, it relates to a novel means of reducing dragout losses of organic quenchants.

The present invention has particular utility in the practice of the quenching process described in U.S. Pat. Nos. 3,224,910 and 3,271,207. The former patent discloses a two-phase quenching process and composition wherein the composition comprises an upper aqueous or brine phase and a lower homogeneous phase of an organic substance, e.g., chlorinated biphenyl or a blend of chlorinated biphenyl and oil. The latter patent discloses a single phase quenching process wherein the quenchant is chlorinated biphenyl or a blend thereof.

The organic quenchant employed in the aforementioned patents is characterized by specific gravity greater than that of water. In the two-phase quenching process of U.S. Pat. No. 3,224,910, therefore, chlorinated biphenyl comprises the lower phase and allows its slower quenching rate to function in the desired sequence, viz., after the fast quenching action of the upper water phase. It is thus possible to accommodate two quenchants in a single tank. Equipment costs are thereby reduced by obviating the prior art need for a separate water quench tank and a separate oil quench tank. Also eliminated is the conveyance means to transfer the heated article from one tank to the other.

There is one disadvantage, however, in the use of an organic quenchant such as chlorinated biphenyl in place of a conventional oil quenchant, viz., cost. The cost of chlorinated biphenyl is high in comparison with that of the familiar oil quenchants. Care must be exercised, therefore, to minimize the consumption of chlorinated biphenyl when practicing the quenching processes of the aforementioned patents. Replenishing of chlorinated biphenyl has considerable economic significance in a production heat treating operation.

One of the most consistent causes of organic quenchant depletion is the adherence of the quenchant to the quenched article after removal from the tank. This is illustrated by a consideration of the steps which occur in the two-phase operation. The article to be quenched is removed from heat treat and transferred to the unitary quench tank. In a typical case the article is first immersed in the upper aqueous phase for a short period and is then immersed in the lower organic phase. After completion of the quenching operation the article is removed from the lower phase and necessarily passes through the upper aqueous phase while being finally extracted from the tank. The aqueous phase is ineffective in removing the organic fluid which has adhered to the article. Thus, a quantity of organic fluid is withdrawn with the article, resulting in some degree of waste of that fluid. This waste is termed "dragout loss" and the magnitude thereof is a function of such factors as quenchant viscosity, the temperature of the quenched article as it is removed from the tank, and the shape of such article.

The result is the same even though an alternate method of quenching contact is employed. For example, it is sometimes more desirable to spray the aqueous phase onto the atricle or, alternatively, each phase can be flowed upon the article to be quenched. In any case, there occurs an adherence of chlorinated biphenyl to the withdrawn article and this represents some degree of depletion and waste.

The present invention provides a novel means and method of recovering the relatively expensive organic quenchant which adheres to an article as it is withdrawn from a quench tank and is achieved without the need for external equipment. The quenching and recovery operations are both accomplished within a unitary quench tank. Only minor modifications are required on existing quench tanks to facilitate the recovery step.

Broadly stated, the present invention improves the efficiency of a quenching operation by the novel introduction of a wash solution which is disposed above the organic quenchant and through which the quenched article is passed as it is withdrawn from the quenching tank. The wash solution floats upon the organic quenchant, and, in the two-phase system described in U.S. Pat. No. 3,224,910, can be segregated from the aqueous upper phase.

It is an object of the present invention, therefore, to provide a novel means of conserving the organic quenchant in a quenching operation. A further object of the present invention is to provide a wash solution capable of removing and recovering the organic quenchant from the surface of the quenched article. Still another object of the present invention is to provide an improved quenching operation having high efficiency. Yet another object of the present invention is to provide a recovery system wherein depletion of the relatively expensive organic quenchant is minimized. Other objects and aspects of the present invention will become apparent from a consideration of the accompanying disclosure and drawing, and the appended claims.

The drawing illustrates a partially-sectioned perspective view of a two-stage quench tank incorporating the features of the present invention, wherein the quench tank is identified by reference numeral 10. Tank 10 can be fabricated from stainless steel or other material which is compatible with the organic quenchant and the temperature involved. Located in the center of the tank, and extending from end to end, is partition 11. Partition 11 can be affixed to the end walls by welding or other suitable means. It is important that a good liquid seal be achieved to prevent leakage around the partition ends.

The purpose of partition 11 is to segregate the aqueous phase quenchant from the wash solution. Partition 11 is positioned so as to vertically extend through the entire depth of the upper aqueous quenchant and partially penetrate into the lower organic phase, for example, a chlorinated biphenyl phase. It is, of course, important to insure that the wash solution has a density lower than that of the organic phase, and that it is not miscible with the organic phase so that it will float upon the surface of the organic phase. Partition 11 penetrates sufficiently into the lower organic phase to prevent any tendency of the upper liquids to flow under during operation of the process.

With further reference to the drawing, the advantages of the present invention can be seen by the following description of operating procedure. The heated metal article is conveyed from the heat treat furnace to the quench tank. The article is immersed in the upper aqueous phase for a brief period and is then immersed in the lower organic phase. The duration of the time an article is maintained in the aqueous phase is dependent upon the section size of the article, its composition, and depth of hardening desired.

After the article has fulfilled its residence period in the organic phase, the normal procedure would be to remove it directly from the quench tank by passing it for a second time through the upper aqueous phase. This has resulted in significant dragout losses of the organic quenchant.

In the present invention, however, there is a substantial departure from the prior practice. Instead of removing the quenched article by way of the aqueous quench phase, the article is passed under partition 11 and extracted from the tank after having passed through a wash solution. The wash solution is designed to remove the organic quenchant from the article so as to minimize dragout loss of this relatively expensive quenchant. The organic quenchant which is thus removed from the quenched article, because of its higher density, settles out from the wash solution and returns by gravity to the organic quenchant reservoir.

In the single tank construction of the drawing, therefore, there is provided the means for a two-stage quench and a final wash solution. The economic advantage of the two-stage quench is thus improved by having eliminated or reduced dragout losses of the lower organic phase. The identical tank construction of the drawing is adaptable to the practice of a single phase quenching process wherein an organic quenchant heavier than water is employed. The aqueous quench phase is merely omitted and the heated article is immersed directly in the lower organic phase for the desired period. Thereupon, the quenched article is passed under partition 11 and extracted from the tank after having passed through the wash solution.

Although the partitioned tank configuration of the drawing comprises the preferred embodiment for practice of the present invention, there are certain applications of the two-phase quenching process wherein it may be expedient to dispense with the partition. Thus, the wash solution would be integrated with the upper aqueous phase of the two-phase quench. By incorporating a cleaner within the upper aqueous quench phase, the need for a partition is obviated. Such a partition-free configuration, however, is susceptible to certain practical limitations. For example, the high initial temperature of the heated article may deleteriously affect certain combination quench-wash solutions. Furthermore, it may often be desirable to maintain the wash solution at a higher temperature than that of the aqueous quenchant wherein a partition of thermally insulated material is advantageous.

The chemical composition of the wash solution of this invention is susceptible to rather wide variation while still being able to accomplish the desired effect. Of prime importance, of course, is the specific gravity of the wash solution. It must be less than that of the organic quenchant. Using chlorinated biphenyl as an example of the latter, the specific gravity at ordinary room temperature varies from 1.18 to 1.62 where the percentage of combined chlorine varies from about 20% to about 60%, by weight, respectively. It is thus seen that many wash solutions of aqueous nature would readily float upon the chlorinated biphenyl.

Aqueous alkaline wash solutions are particularly suitable in the present invention. Water is an important component in an alkaline wash solution because water readily transmits heat and agitation to the article to reduce the viscosity of the organic quenchant to be removed. Water also carries the ingredients of the cleaner to the article, flushes the article, and carries away the organic quenchant, to return it to the lower phase surface. Alkaline wash solutions are formulated to improve the action of the water. The chief constituents are builders and surface-active agents which provide alkalinity and other desirable properties. Several builders may be used in a given wash solution, in proportions that vary for each type of use. In addition to the effect of proportions on efficiency of washing, the characteristics of the builder must be considered in relation to the kind of substance being removed and to the metal being washed. Typical wash solution builders include various sodium compounds such as sodium carbonate, the sodium phosphates, sodium silicates and sodium hydroxide.

Phosphates, such as trisodium phosphate, tetrasodium pyrophosphate, and sodium tripolyphosphate are widely used builders. They impart alkalinity, rinsability, and some buffering action. They also serve as water softeners. Tetrasodium pyrophosphate and sodium tripolyphosphate also have some sequestering properties. Tetrasodium pyrophosphate is a good detergent.

Tetrasodium pyrophosphate, like all polyphosphates, will revert to the orthophosphate form. The rate of reversion depends upon pH, temperature, time and concentration. This is not a serious disadvantage if small builder additions are made daily with the water additions to replace losses from dragout and evaporation. Aqueous solutions of tetrasodium pyrophosphate have been successfully employed to remove chlorinated biphenyl from metal articles.

Soaps and synthetic detergents are often added to alkaline wash solutions to reduce surface tension and interfacial tension, and to enhance cleaning action. Sodium resinate is an example of a soap suitable for this use. In small amounts, however, resinate soaps do not lower surface and interfacial tensions as much as synthetic detergents.

Synthetic detergents are extensively used as surface-active agents in wash solutions because they rinse more freely than soaps, are effective in softening hard water, and effectively reduce surface and interfacial tensions. They are less susceptible than soaps to contamination by acid residues.

Nonionic synthetic detergents are preferred over anionic detergents in wash solutions such as that of the present invention because they produce less suds. The nonionics most commonly used are sulfonated esters and ethers, and those of the polyoxyethylene type. The latter is a combination of ethylene oxide condensed on a base such as polyoxypropylene. Generally, the ethylene oxide percentage should be as high as possible without producing excessive foaming of the wash solution.

Referring now to a preferred organic quenchant of the quenching processes to which the present invention relates, chlorinated biphenyl comprises the major proportion of the organic phase. Because of fire prevention consideration, it is generally preferred that chlorinated biphenyl constitute at least 50% and, even more desirably, essentially all of the organic phase. However, the organic phase can be a homogeneous blend of chlorinated biphenyl and oil, e.g., fish oils, marine oils, animal oils and mineral oils, or other materials wherein the blends still have a specific gravity sufficiently greater than that of the aqueous quench and wash phase at the operating temperature of the composition.

Additionally, other chlorinated aliphatic and aromatic hydrocarbons such as trichlorobenzene or tetrachlorobenzene, chlorinated terphenyl and chlorinated naphthalene can be blended with chlorinated biphenyl to provide the organic quenchant. In particular, the use of trichlorobenzene in an amount up to 10% to 15% of the chlorinated biphenyl content of the organic phase is quite desirable where the quenching operation is to be conducted under conditions of low temperature, since the viscosity of the resulting blend at low temperatures is significantly reduced by such use of trichlorobenzene without also effecting a significant undesired decrease in the other properties of the organic phase. Reduction of viscosity in itself tends to reduce dragout tendencies.

The aqueous phase, the organic phase, or both phases may contain functional additives such as quenching speed modifiers, viscosity modifiers, wetting agents, antioxidants, rust inhibitors, pour point depressants, and the like, such as organic sulfonates, fatty acids, amines, silica sols, high molecular weight ethylene or propylene oxide polymers, soluble gums, such as carboxy methyl cellulose, methyl cellulose and hydroxy ethyl cellulose, terpene polymer resins, heat treated vegetable oils, residues from petroleum refining, partially oxidized petroleum hydrocarbons, alkylphenol-ethylene oxide condensates, alkylphenol polyethylene glycols, sodium alkyl sulfates, polyoxyethylene esters of tall oil, organic sulfonates, e.g. sodium sulfonate, barium and calcium sulfonate, metal naphthenates, reaction products of organic sulfonates and a phosphorus sulfide, reaction products of a phosphorus sulfide and an organic amine, mono-, di- and triethanolamine, sodium, potassium or ammonium borate, dimers of linoleic acid and other fatty acids, the reaction products of an alkenyl succinic anhydride, aliphatic acid and polyalkylene polyamine, phosphites, and phenyl-alpha-naphthylamine.

Similarly, the wash solutions taught by the present invention can contain conventional functional additives other than those described which aid in the recovery of the organic phase from the quenched article as the latter is removed from the quench tank.

It is to be understood that the quench tank configuration shown in the drawing is merely illustrative. Numerous modifications of quench tanks are known in the art and many of these are compatible with the instant invention. For example, the quenching art teaches automated systems wherein the heated article is brought from the furnace on a continuous belt and introduced to the quench tank. Upon entering the tank, the article engages hooks on an inclined continuous steel belt which is immersed in the quenchants, and one end section of the belt extends outside the tank on the discharge side. Agitators are often provided adjacent to the belt to promote circulation of the quenchant around the quenched article. Agitation of the wash solution of the present invention has advantageous effects. Fluid temperature control means are also employed. In adapting the continuous belt conveyor principle to the present invention, a double-inclined belt design would be effective. The downward inclination would allow the heated article to descend through the one or two quenching phases and under the tank partition. The upward inclination would carry the article out of the lower phase, through the wash solution, and out of the tank.

While this invention has been described with respect to certain specific embodiments, it is not so limited, and it is to be understood that variations and modifications thereof may be made without departing from the spirit or scope of the following claims.

The embodiments of this invention in which an exclusive property or privilege is claimed are defined as follows:

1. In a process for quenching heated metal in a two-phase composition comprising an upper aqueous phase and a lower organic phase comprising a major proportion of chlorinated biphenyl, the improvement which comprises providing an aqueous wash solution above and in contiguity with said organic phase, but physically separated from said aqueous phase.

2. A process of claim 1 wherein said lower organic phase is chlorinated biphenyl containing from about 5% to about 60% by weight of combined chlorine.

3. A process of claim 1 wherein said lower organic phase is a blend of oil and chlorinated biphenyl containing from about 5% to about 60% by weight of combined chlorine.

4. A process of claim 1 wherein said aqueous wash solution contains an alkali metal polyphosphate.

5. A process of claim 1 wherein said aqueous wash solution contains a nonionic detergent.

6. In a process for quenching heated metal in a two-phase composition comprising an upper aqueous phase and a lower organic phase comprising a major portion of chlorinated biphenyl, the improvement which comprises untilizing an aqueous wash solution as said upper aqueous phase.

7. A process of claim 6 wherein said aqueous wash solution contains an alkali metal polyphosphate.

8. A process of claim 6 wherein said aqueous wash solution contains a nonionic detergent.

9. In a process for quenching heated metal in an organic liquid comprising a major proportion of chlorinated biphenyl, the improvement which comprises providing an aqueous wash solution above and in contiguity with the surface of said organic liquid while allowing part of said surface to remain exposed.

10. A process of claim 9 wherein said aqueous wash solution contains an alkali metal polyphosphate.

11. A process of claim 9 wherein said aqueous wash solution contains a nonionic detergent.

12. In a process for quenching heated metal in a 2-phase composition comprising an upper aqueous phase and a lower organic phase comprising a major proportion of chlorinated biphenyl, the improvement which comprises providing above and in contiguity with said organic phase, but physically separated from said aqueous phase, an alkaline wash solution comprising in aqueous solution a builder and surface active agent.

13. A process of claim 12 wherein said builder is a sodium compound selected from the group consisting of sodium carbonate, sodium phosphate, sodium silicate, and sodium hydroxide.

14. A process of claim 12 wherein the surface active agent is selected from the group consisting of soaps and synthetic detergents.

15. In a process for quenching heated metal in an organic liquid comprising a major proportion of chlorinated biphenyl, the improvement which comprises providing an alkaline wash solution above and in contiguity with the surface of said organic liquid while allowing part of said surface to remain exposed, said alkaline wash solution comprising in aqueous solution a builder and surface active agent.

16. A process of claim 15 wherein the builder is a sodium compound selected from the group consisting of sodium carbonate, sodium phosphate, sodium silicate, and sodium hydroxide.

17. A process of claim 15 wherein the surface active agent is selected from the group consisting of soaps and synthetic detergents.

18. In a process for quenching heated metal in a two-phase composition comprising an upper aqueous phase and a lower organic phase comprising a major proportion of chlorinated biphenyl, the improvement which comprises utilizing as said upper aqueous phase an alkaline wash solution comprising in aqueous solution a builder and surface active agent.

References Cited
UNITED STATES PATENTS

| | | | |
|---|---|---|---|
| 466,442 | 1/1892 | Simonds | 148—18 |
| 1,904,706 | 4/1933 | Bellis | 148—156X |
| 2,304,451 | 12/1942 | Gottlieb | 148—18 |
| 2,322,777 | 6/1943 | Purnell | 148—157X |
| 3,224,910 | 12/1965 | McEwen | 148—143 |

CHARLES N. LOVELL, Primary Examiner

U.S. Cl. X.R.

134—2; 148—13.1, 20.6, 143, 155, 157; 252—67